United States Patent
Shafer (10) Patent No.: US 10,458,587 B2
(45) Date of Patent: Oct. 29, 2019

(54) MECHANICAL PIPING SYSTEM AND METHOD OF MANUFACTURE

(76) Inventor: Terry Shafer, Montgomery, TX (US)

(*) Notice: Subject to any disclaimer, the term of this patent is extended or adjusted under 35 U.S.C. 154(b) by 0 days.

(21) Appl. No.: 13/436,296

(22) Filed: Mar. 30, 2012

(65) Prior Publication Data

US 2013/0037124 A1 Feb. 14, 2013

Related U.S. Application Data

(60) Provisional application No. 61/469,450, filed on Mar. 30, 2011.

(51) Int. Cl.
*F16L 47/12* (2006.01)
*F16L 47/06* (2006.01)

(52) U.S. Cl.
CPC .......... *F16L 47/06* (2013.01); *F16L 47/12* (2013.01); *Y10T 137/0447* (2015.04)

(58) Field of Classification Search
CPC . F16L 47/06; F16L 47/12; F16L 47/04; Y10T 137/0447; B21D 39/04
USPC .......... 29/237, 525.01, 889.5; 137/15.09; 285/382, 112, 371, 373, 398, 419, 423
See application file for complete search history.

(56) References Cited

U.S. PATENT DOCUMENTS

| | | | |
|---|---|---|---|
| 1,570,887 A | 1/1926 | Graves | |
| 2,766,518 A * | 10/1956 | Costanzo | F16L 17/04 285/112 |
| 3,228,714 A * | 1/1966 | Dricken | 285/236 |
| 3,503,632 A * | 3/1970 | Braun | 285/48 |
| 4,037,626 A * | 7/1977 | Roberts, Jr. | F16L 9/127 138/109 |
| 4,231,596 A * | 11/1980 | Ridenour | B21D 39/04 285/382.2 |
| 4,463,955 A | 8/1984 | Delhaus et al. | |
| 4,824,147 A * | 4/1989 | De Gruijter | F16L 25/03 174/85 |
| 5,139,290 A * | 8/1992 | Shafer | 285/112 |
| 6,276,727 B1 * | 8/2001 | Schlicht | F16L 25/065 285/371 |
| 6,702,336 B1 | 9/2004 | Chelchowski et al. | |
| 6,983,960 B2 | 1/2006 | Svetlik | |
| 7,524,387 B2 | 4/2009 | Kennedy | |
| 7,614,661 B1 | 11/2009 | Ruffle et al. | |
| 7,874,307 B1 * | 1/2011 | Deocampo | 137/15.09 |

(Continued)

OTHER PUBLICATIONS

International Search Report and Written Opinion issued in related International Application No. PCT/US2012/031492, dated Jun. 20, 2012, 9 pages.

*Primary Examiner* — Jacob J Cigna
*Assistant Examiner* — Lee A Holly
(74) *Attorney, Agent, or Firm* — Baker Botts L.L.P.

(57) ABSTRACT

A mechanical piping system and method is described herein. The system includes a first pipe with a first connection element disposed on an outer surface of the first pipe. The system also includes a second pipe with a second connection element disposed on an outer surface of the second pipe. An alignment element may also be included, with the alignment element creating a sealed flow path through the first pipe and the second pipe. Also, an external collar assembly may be included. The external collar assembly may engage the first connection element and second connection element and laterally secure the first pipe relative to the second pipe.

18 Claims, 8 Drawing Sheets

(56) References Cited

U.S. PATENT DOCUMENTS

2001/0031324 A1* 10/2001 Rosenberg .................. 428/34.7
2006/0131876 A1*  6/2006 Knowles et al. ............. 285/242
2008/0221469 A1*  9/2008 Shevchuk .................... 600/532
2009/0291001 A1* 11/2009 Neuroth et al. ........... 417/410.1

* cited by examiner

MECHANICAL PIPING SYSTEM AND METHOD OF MANUFACTURE

CROSS-REFERENCE TO RELATED APPLICATION

This application claims priority to the U.S. Provisional Application No. 61/469,450, filed Mar. 30, 2011, which is incorporated herein by reference in its entirety for all purposes.

TECHNICAL FIELD

The present disclosure relates generally to piping and, more particularly, to a mechanical piping system and a method of manufacturing the same.

BACKGROUND

Field operations involving piping work are conducted in a variety of different locations and involve a variety of piping needs, depending on the particular situations. In many cases, available piping fails to meet particular design requirements, such as desirable ratings of strength, stiffness, impact resistance, strength-to-weight ratios, and resistance to corrosion. In many cases, the requisite piping for different operations is hauled to a work site, where it may be stored until needed. Connecting pipes within a pressure system can be problematic depending on the application.

SUMMARY

In accordance with the present disclosure, a mechanical piping system and method is described herein. The system includes a first pipe with a first connection element disposed on an outer surface of the first pipe. The first connection element, for example, may be a sealed elastic polymer integrated into the first pipe, or may be fused to the first pipe using electrofusion. The system may also include a second pipe with a second connection element disposed on an outer surface of the second pipe. An alignment element may also be included, with the alignment element creating a sealed flow path through the first pipe and the second pipe. Also, an external collar assembly may be included. The external collar assembly may engage the first connection element and second connection element and laterally secure the first pipe relative to the second pipe.

The system and method disclosed herein is technically advantageous because it creates a mechanical piping system for use in high pressure applications, including high pressure fracking applications, forced pressure sewage loops, pressure rated fire loops, temporary pressure systems for both fresh water and potable water for natural disasters, and pressure loops for oil and gas line repairs. The system and method are further advantageous because the pipes are lighter than in existing piping systems and are also less prone to leakage. The system and method are also advantageous in that they incorporate time saving elements, making deployment of the piping system easier and faster than in current applications. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF THE DISCLOSURE

The present disclosure relates generally to piping and, more particularly, to a mechanical piping system and a method of manufacturing the same. Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

This disclosure is directed to a mechanical piping system and a method of manufacturing pipes for use in the mechanical piping system. One example pipe may be a composite pipe, which may include a connection element integrated within the pipe structure. The composite pipe may be made by spiral winding a composite extrudate or film around an internally supported structure, such as pipe made of polyethylene or polypropylene, or any other appropriate thermal plastic. The composite film may also be comprised of a thermoplastic and may include additives, such as glass fibers, to increase the strength of the film. The composite film may bond molecularly to the internally supported structure. The number of layers of the composite material wrapped around the pipe may determine the pressure rating for the composite pipe. In certain embodiments, the wrapping may be uni-directional, meaning that each layer of the composite film is wrapped around the internally supported structure in the same direction. In other embodiments, the wrapping may be bi-directional, meaning that the layers of the composite film may be wrapped in different directions. For example, one layer may be wrapped clockwise around the internally supported structure, while the next layer may be wrapped counter-clockwise. A bi-directional wrapping may increase the strength of the composite pipe, allowing for a higher pressure rating.

Figure 1:
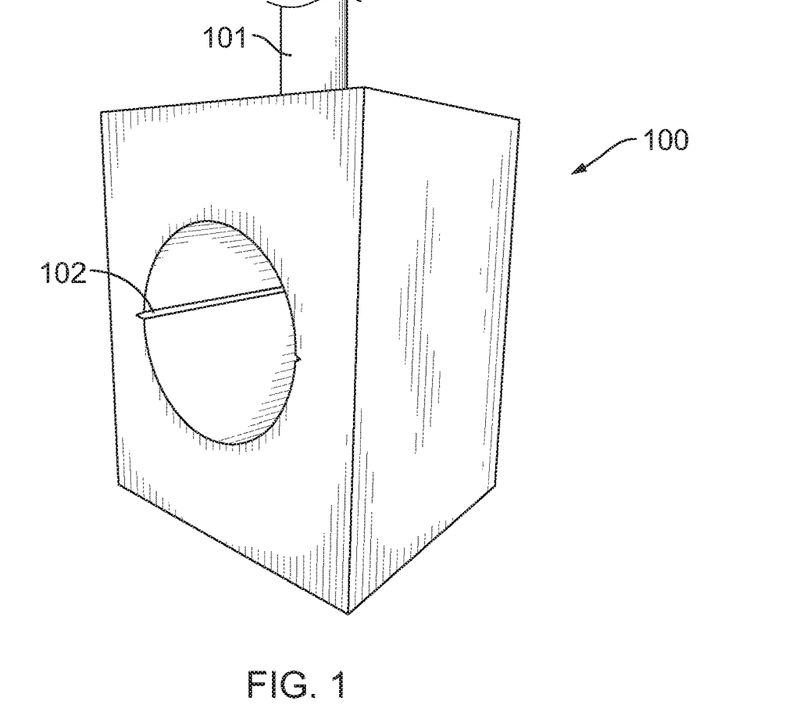
FIG. 1 is an example molding die for manufacturing pipes.

Once the pipe is wrapped a pre-determined number of times, a section of the pipe may be wrapped with additional layers of the composite film. The additional layers of composite film may create an extra composite layer, which may be molded into a connection element. A metal molding die 100, as shown in FIG. 1, may impart connection elements onto the composite pipe using, for example, hydraulic pressure through piston 101. The molding die may, for example, be machined out of a suitable metal and include an inner face 102 to impart connection elements such as grooves, ledges, and shoulders onto the composite pipe that may be used to connect the composite pipe to other pipes, such as in the mechanical piping system described below. In addition, a molded or machined thermoplastic component or composite component may be electrofused to a pipe.

Other connection elements are possible as would be appreciated by one of ordinary skill in the art in view of this disclosure. In some embodiments, the molding die may heat the thickened composite layer in order to impart the connection elements. In some embodiments, the molding die may also seal the composite layers at the end of the pipe by applying a protective layer, of similar composition to the protective layer wrapped around the composite pipe, to the end of the composite pipe to protect the exposed layers of the pipe, while still leaving the bore of the pipe open. The molding die may also fuse each of the layers, including the thermoplastic layers and the tape layers to provide one homogeneous piping system.

Connection elements may be included, for example, on external surfaces of composite pipes, or integrated into composite connectors for a mechanical piping system, as will be described below. The thickness of the extra composite layer may depend on the design criteria of the connection element, including the pressure rating for the corresponding piping system. The extra composite layer may be wrapped uni-directionally or bi-directionally, as described above. After the pipe is wrapped so as to include an extra composite layer of a desired thickness, an additional layer of thermoplastic extrudate or film may be wrapped around the entire pipe, surrounding the composite layer, to provide a protective layer. In addition, a molded or machined thermoplastic component or composite component may be placed around a composite pipe and electrofused to the pipe.

Figure 2:
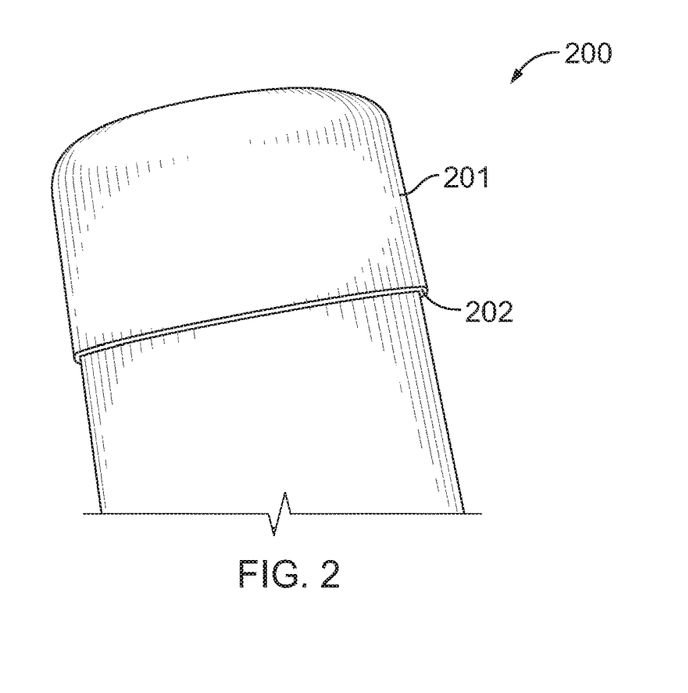
FIG. 2 is an example pipe portion according to aspects of the present disclosure.

In one example embodiment, such as in FIG. 2, the molding die may be used to form a connection element, shoulder 202, defined by a raised portion 201 made from a thickened composite layer proximate an end of a composite pipe 200. The raised portion may include a substantially constant pre-determined circumference, which is larger than the circumference of the remainder of the composite pipe 200. The transition between the raised portion and the remainder of the pipe may form the shoulder 202. The shoulder 202 may include a face extending outward from the non-raised portion of the pipe in a direction generally perpendicular to the axis of the pipe. In other embodiments, the raised portion 201 may include additional connection elements, such as one or more grooves, notches, or other mechanisms, by which the composite pipe may be connected with additional pipes as part of a mechanical piping system, according to aspects of the present disclosure.

Figure 3:
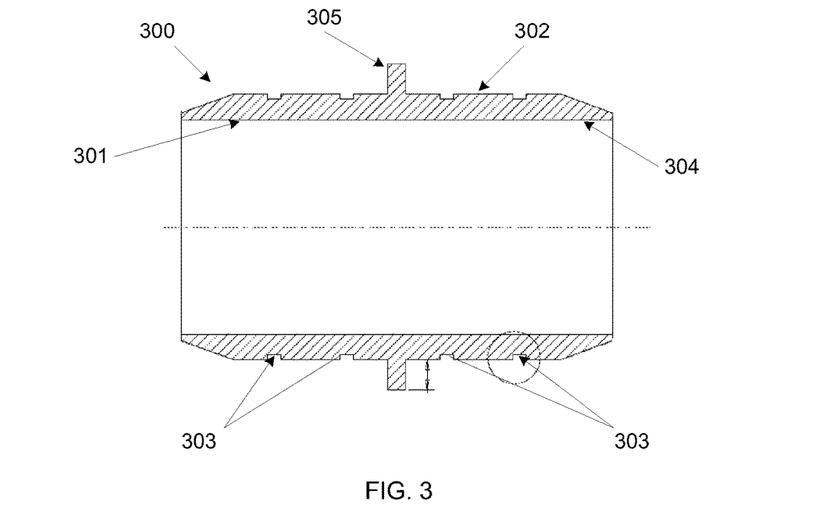
FIG. 3 is a cross-section of an example alignment element according to aspects of the present disclosure.
Figure 4:
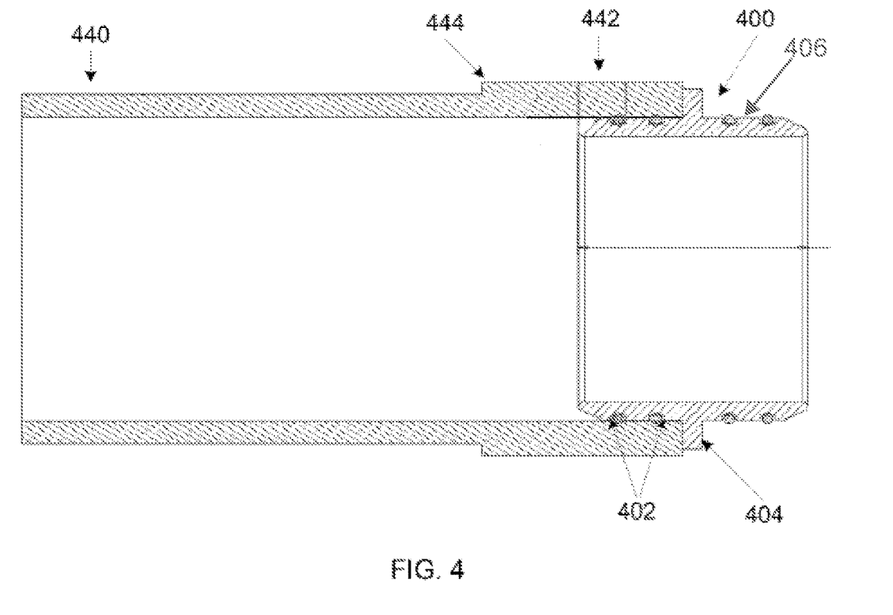
FIG. 4 illustrates a cross-section of an example alignment element installed within an example pipe.

Certain embodiments of a mechanical piping system may include alignment elements, which may align two pipes and create a sealed flow path through the first pipe and the second pipes. One example alignment element is t-connector 300 shown in FIG. 3. The t-connector 300 may be injection molded or machined from thermoplastic material or molded composite material, depending on the application. The t-connector 300 may have a generally cylindrical shape with an internal bore 301 and an external surface 302. The external surface 302 may include a circumference substantially the same as an internal circumference of a composite pipe, so that the t-connector may be inserted into composite pipe, as shown in FIG. 4. The t-connector 300 may also include a groove 303 disposed on the external surface 302 in which a seal maybe installed. The t-connector 300 may also include a raised portion, ring 305, extending from the external surface 302 of the t-connector 300, which may abut the end of a pipe when the t-connector 300 is installed within the pipe, as can be seen in FIG. 4. The seal may be any number of seals well known in the art, such as o-rings. In other embodiments, a t-connector may include multiple grooves and multiple types of seals may be used. In certain embodiments, the t-connector may also include beveled edges 304. The beveled edges 304 may allow for easier insertion of the t-connector within an internal bores of a composite pipe, as will be discussed below.

As shown in FIG. 4, in certain embodiments, a t-connector 400 may be inserted into the interior bore of a composite pipe 440. The composite pipe 440 may include a raised portion 442 and a shoulder 444, similar to raised portion and shoulder described previously. Once inserted, seals 402 of the t-connector 400 may engage with an interior surface of composite pipe 440. The t-connector 400 may also include a ring 404 that extends outwardly from an exterior surface 406 of the t-connector 400. The ring 404 may abut an end of the composite pipe 440 when the t-connector 400 is installed within the composite pipe 440. As can also be seen in FIG. 4, the ring 404 may prevent the entire t-connector from being inserted within a single composite pipe. The portion of the t-connector 400 not installed inside composite pipe 440 may be substantially the same as the portion of the t-connector 400 installed within the composite pipe 440, so that another composite pipe, similar to composite pipe 440, may be connected to composite pipe 440 using t-connector 400.

Figure 5A:
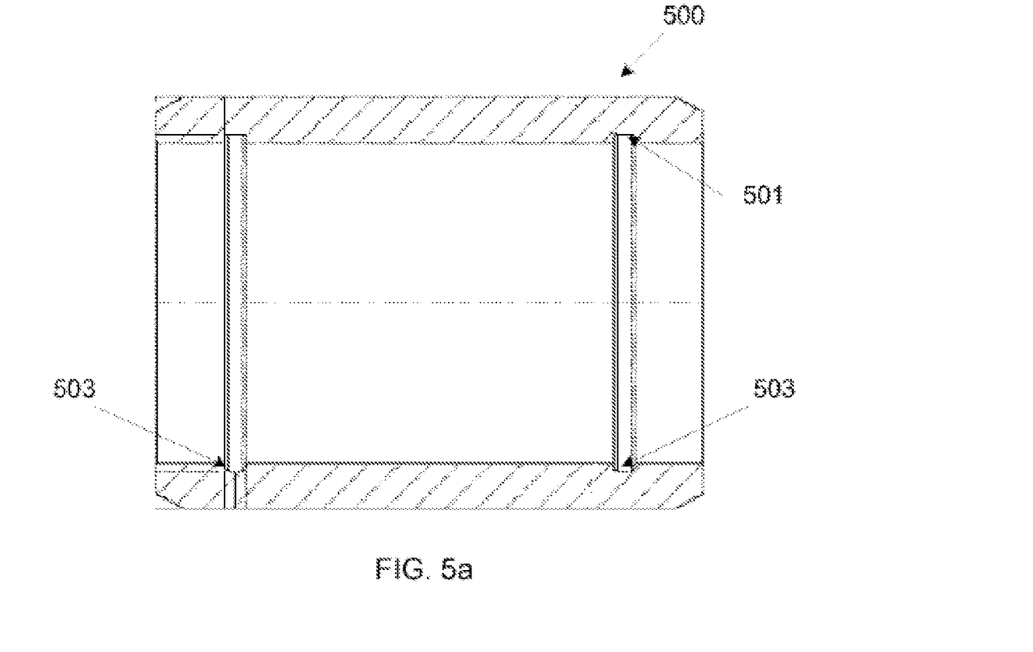
FIGS. 5a and 5b illustrate an example collar incorporating aspects of the present disclosure
Figure 5B:
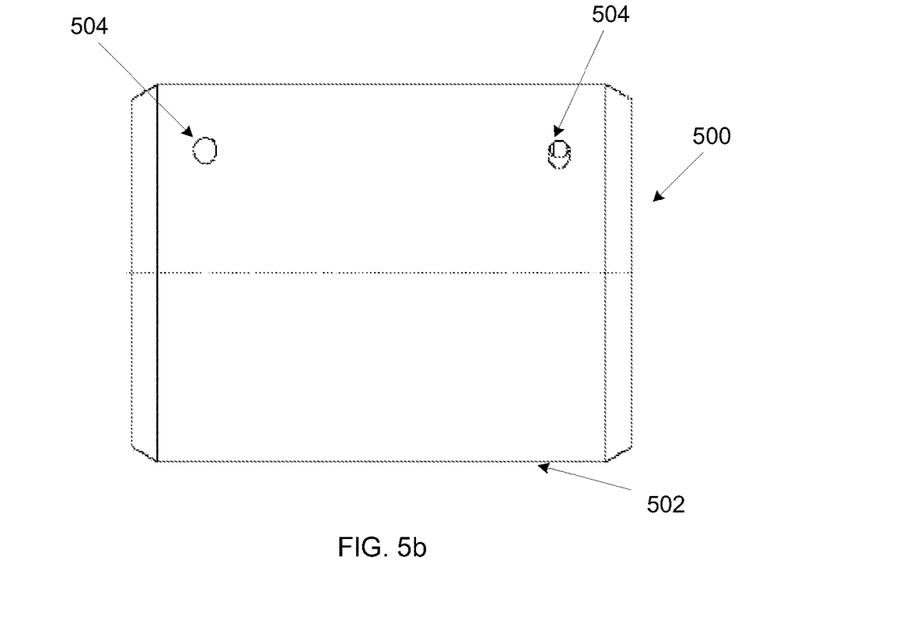

In certain embodiments, a mechanical piping system may include an external collar assembly. The external collar assembly may engage a first connection element on a first pipe and second connection element on a second pipe and laterally secure the first pipe relative to the second pipe. One example external collar assembly includes collar 500 shown in FIGS. 5a and 5b. The pipe-collar 500 may include an interior bore 501 and an exterior surface 502. The interior surface of the pipe-collar may include grooves 503. In certain embodiments, the interior bore 501 of the pipe-collar may have a circumference similar to the circumference of the raised portion of a composite pipe, molded as previously discussed. The pipe-collar 500 may also include holes 504, substantially aligned with grooves 503.

Figure 6:
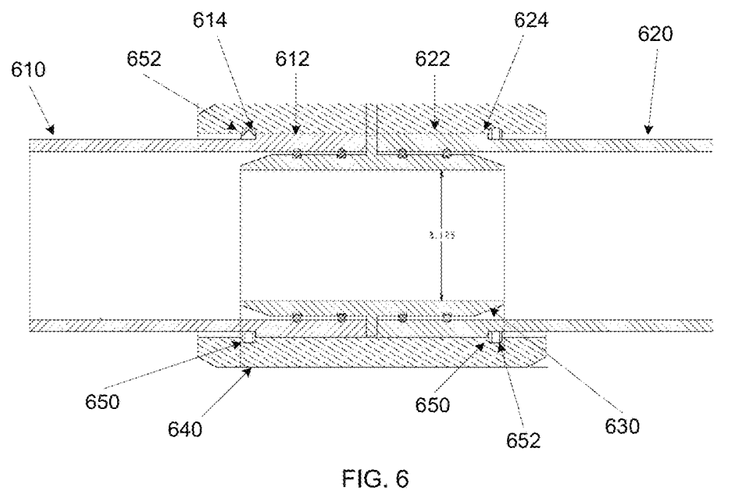
FIG. 6 illustrates a cross section of one embodiment of a mechanical piping system incorporating aspects of the present disclosure.

In certain embodiments, a collar similar to collar 500 may be used with pipes and alignment elements in a mechanical piping system incorporating aspects of the present disclosure. As can be seen in FIG. 6, two composite pipes 610 and 620 may be connected using an alignment element, t-connector 630. A collar 640 may slide over the raised portions 612 and 622 of composite pipes 610 and 620. The external collar assembly may also include steel cables 650, which may be installed through a hole on the exterior surface of the pipe-collar into one of the grooves 652 once the collar 640 is in place. The cables 650 may slide along the grooves 652, circling the composite pipes 610 and 620, until they reach a groove stopper, proximate the hole. When installed, the steel cables 650 engage with the grooves 652 in the pipe collar and the shoulders 614 and 624 of composite pipes 610 and 620, laterally securing the pipe 610 relative to the pipe 620.

Figure 7A:
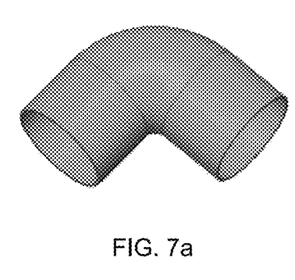
FIGS. 7a-c illustrates example pipes according to aspects of the present disclosure.
Figure 7B:
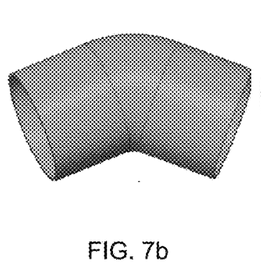
Figure 7C:
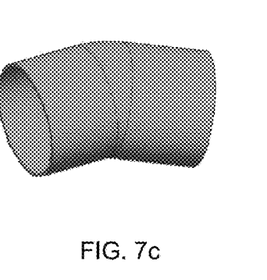

Although the pipes shown thus far have been substantially straight, pipes can take a variety of configurations within the scope of this disclosure. In certain embodiments, the pipes can include angled fittings, as can be seen in FIG. 7a-c. The angled fittings may be injection molded, similar to the t-connector and pipe-collar mentioned previously. In certain embodiments, the angled fittings may be molded out of a composite resin including long resin fibers to increase the pressure rating. In other embodiments, the fitting may be molded and then wrapped with composite film, similar to the composite file used to wrap the composite pipes mentioned earlier, to increase the pressure rating. The angled fitting may be at a variety of angles, such as 90 degrees in FIG. 7a, 45 degrees in FIGS. 7b, and 22.5 degrees in FIG. 7c, and may, for example, be placed between lengths of composite pipe, depending on the angle needed when the pipes are being connected. In some embodiments, the fittings may be connected to composite pipes using an alignment element and external collar assembly. In other embodiments, the fittings may be manufactured to include an integrated alignment element. The integrated alignment element may, in some embodiments, be of substantially similar shape to one half of a t-connector described previously. In other words, the fitting may look like it has one half of a t-connector installed within the fitting with the other end of the t-connector external to the fitting, available to be inserted into a composite pipe. Instead of installing one end of a t-connector into the fitting, however, the fitting may be manufactured to include the connector portion, so that the fitting can be connected directly to a pipe without having to insert an additional t-connector.

Figure 8:
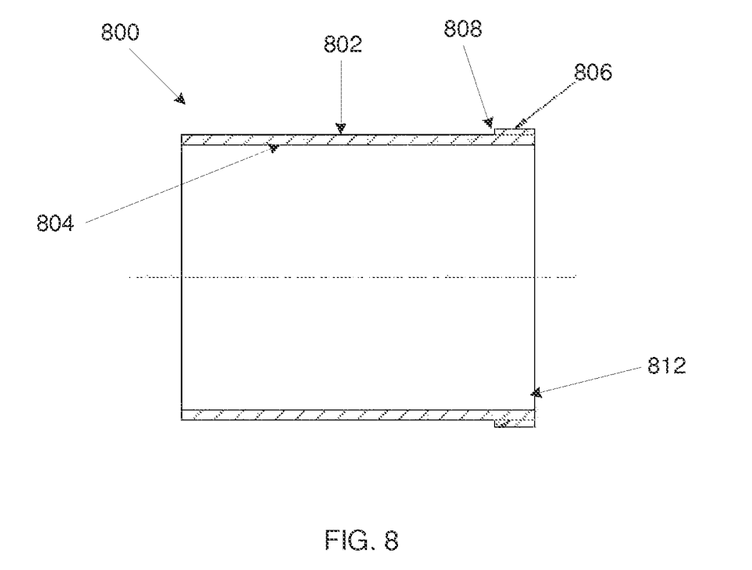
FIG. 8 illustrates an example pipe, according to aspects of the present disclosure.

FIG. 8 illustrates an example pipe portion 800, according to aspects of the present disclosure. In certain embodiment, the pipe portion 800 may be comprised of a composite material, manufactured in a manner similar to that described above. The pipe portion 800 may include an outer surface 802 and an inner surface 804. The pipe portion 800 may also include a connection element, shoulder 808 disposed on an outer surface 802. The shoulder 808 may be defined may a raised portion 806 of the pipe portion 806, proximate an end of the pipe 812. In certain embodiments, the raised portion 806 and the shoulder 808 may be molded to composite pipe 806 in a manner similar to that described above. In the embodiment shown, the raised portion 806 and shoulder 808 may be fused to the composited pipe 800 by electrostatic fusion. In particular, the raised portion may be wrapped around the pipe and an electrical current may be run through the raised portion 806, fusing the raised portion 806 to the pipe 800, and thereby creating the shoulder 808.

Figure 9:
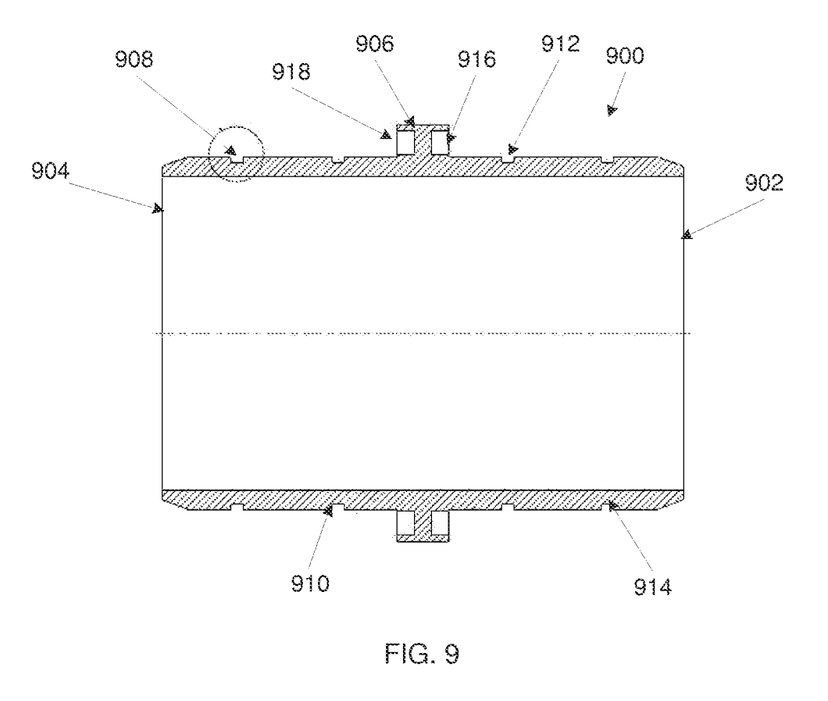
FIG. 9 illustrates an example alignment element, according to aspects of the present disclosure.

FIG. 9 illustrates an example alignment element, t-connector 900. The t-connector 900 may be similar to the t-connectors described above; except that t-connector 900 may include locking channels 918 and 916 to engage with the ends of pipes aligned using the t-connector 900 for additional stability and rigidity. In particular, t-connector 900 may include a first end 902 and a second end 904. A raised portion 906 may be disposed on an outer surface 906 of the t-connector 900 between the first end 902 and the second end 904. The t-connector 900 may include grooves 908-914 on an outer surface of the t-connector 900 to accommodate seals which may engage the inner surfaces of pipe in which the t-connector 900 is installed. The internal opening within the t-connector 900 may define a flow path through the pipe which are aligned and coupled using the t-connector 900.

Figure 10:
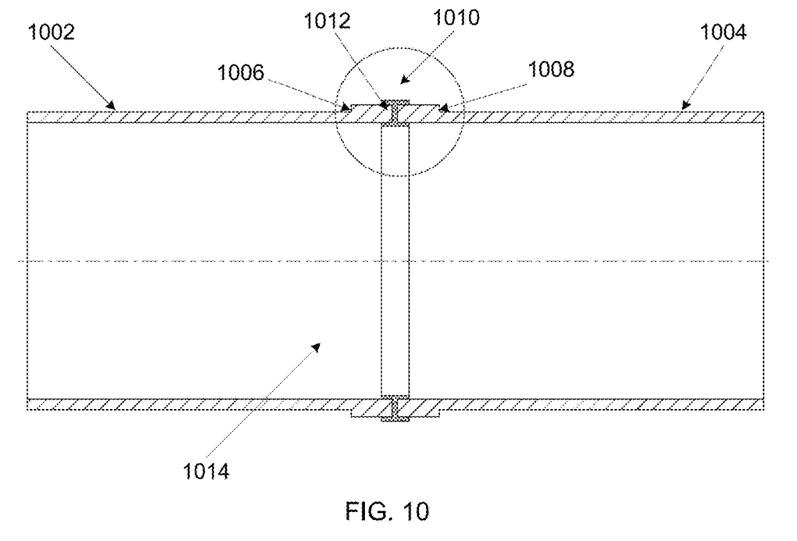
FIG. 10 illustrates a cross-section of two pipes aligned using an example alignment element, according to aspects of the present disclosure.

FIG. 10 illustrates a first pipe 1002 and a second pipe 1004 aligned and coupled using an alignment element, rubber gasket 1010. As can be seen, the first pipe may include a first connection element, shoulder 1006 Likewise, second pipe 1004 may include a second connection element, shoulder 1008. Shoulders 1006 and 1008 may engage with a collar (not shown) positioned around the first pipe 1002, second pipe 1004, and rubber gasket 1010, to laterally secure the first pipe 1002 relative to the second pipe 1004. Likewise, the first pipe 1002, the second pipe 1004, and the rubber gasket 1010 may define a flow path through the pipes. The rubber gasket 1010 may engage the first pipe 1002 and the second pipe 1004 at a rubber surface 1012. Advantageously, the rubber gasket 1010 may allow the first pipe 1002 to flex relative to the second pipe 1004 in configurations where flexure is appropriate.

Figure 11:
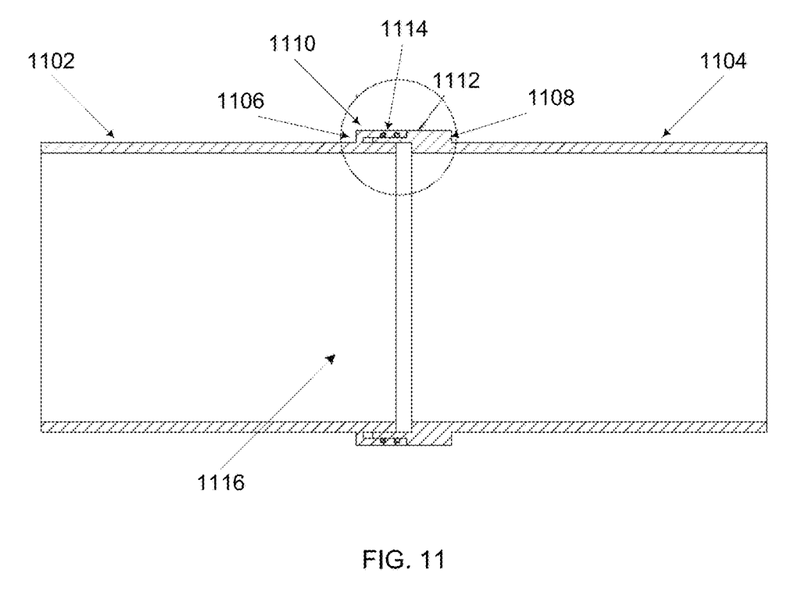
FIG. 11 illustrates a cross-section of two pipe aligned using an example alignment element, according to aspects of the present disclosure.

FIG. 11 illustrates an example embodiment whereby the alignment element is integral with the first pipe 1102 and the second pipe 1104. In particular, first pipe 1102 includes an integral bell 1110 on an end of the pipe 1102 adjacent to the shoulder 1106, which is disposed on an outer surface of the first pipe 1106. The second pipe 1104, in contrast, may comprise a spigot 1112 on an end of pipe 1104 adjacent to a shoulder 1108 disposed on an outer surface of the second pipe 1104. The bell 1110 may include seals 1114 to seal the spigot 1112 within the bell 1110. As can be seen, the configuration in FIG. 11 may define a flow path 1116 through the first and second pipes. Likewise, although a collar is not shown, the first pipe 1102 and the second pipe 1104 may be laterally secured relative to one another using a collar (not shown) that engages the connection elements 1106 and 1108.

Figure 12A:
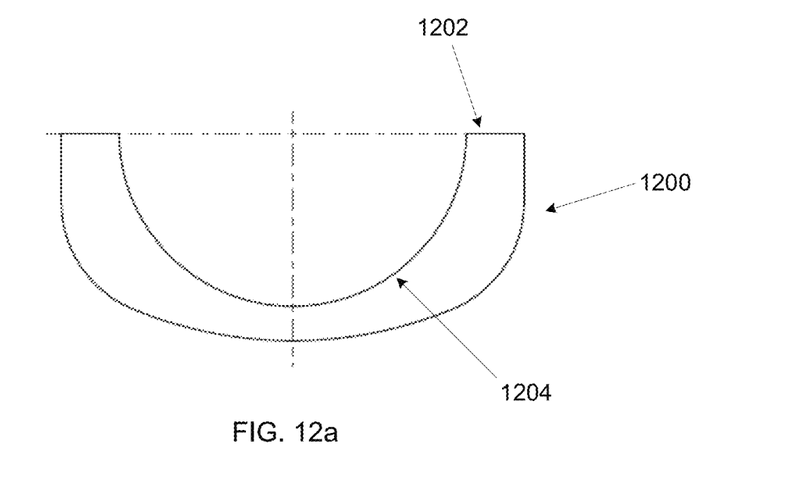
FIGS. 12a and 12b illustrate an example alignment element, according to aspects of the present disclosure.
Figure 12B:
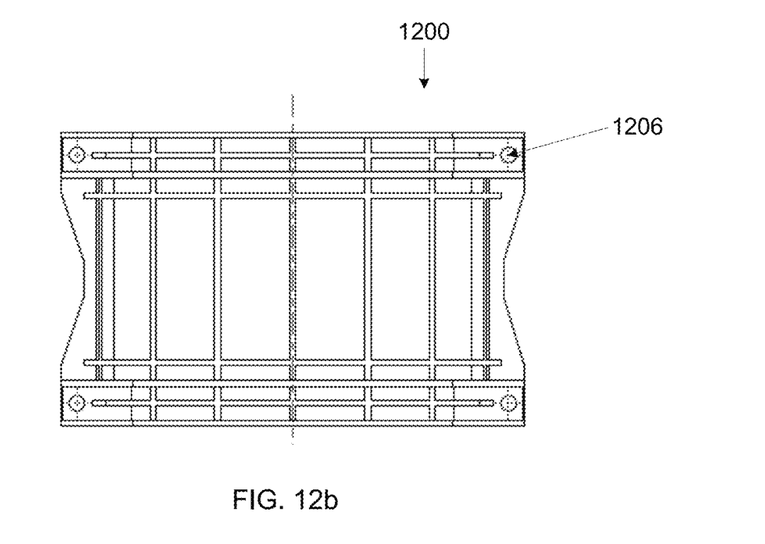

FIGS. 12a and 12b illustrate an example collar, cage 1200. The cage 1200 may be manufactured of composite material in two similarly shaped pieces, which may be bolted together around a pipe assembly. In particular, the cage may comprise two pieces with a flat fact 1202. The flat face 1202 may correspond with bolts holes 1206, through which one side of the cage may be bolted to the other. The cage may comprise at least one shoulder 1204 on an inner surface which engages with a shoulder on a pipe when it is installed. The shoulder 1204 of the cage 1200 may prevent or reduce lateral movement of one pipe relative to the other when the cage is installed.

Figure 13:
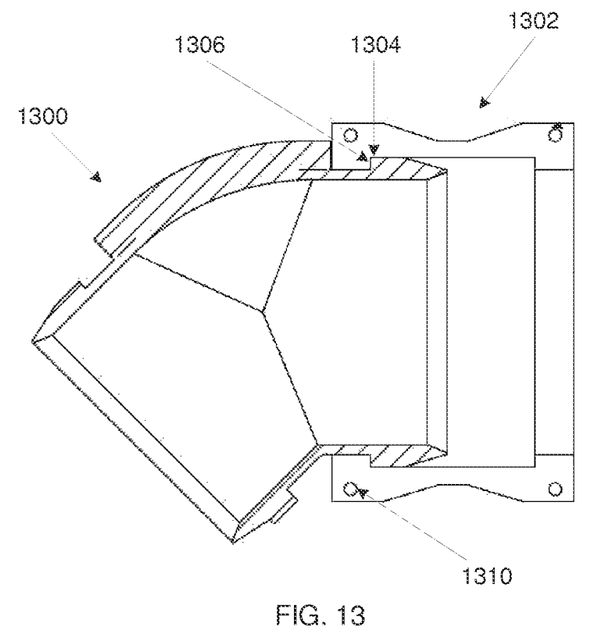
FIG. 13 illustrates an example pipe coupled to an example alignment element, according to aspects of the present disclosure.

FIG. 13 illustrates an example pipe 1300 engaged with collar 1302. In particular, collar 1302 comprises a cage with at least two bolt-on pieces. As can be seen, the cage 1302 may include a shoulder 1306 which engages with a connection element, shoulder 1304, on an exterior surface of the pipe 1300. The case 1302 may include bolt holes 1310 which may correspond to bolt holes on a corresponding piece of the cage 1302 not shown in this cross-section.

As will be appreciated by one of ordinary skill in view of this disclosure, the mechanical piping system is advantageous because it affords interchangeable coupling configurations that provide for high pressure seals. Additionally, because the element of the mechanical piping system may be manufactured out of composite materials, the piping system may be light compared to metal piping systems as well as comparatively quick to manufacture.

Although the present disclosure has been described in detail, it should be understood that various changes, substitutions, and alterations can be made hereto without departing from the spirit and the scope of the disclosure as defined by the appended claims.

What is claimed is:

1. A mechanical piping system, comprising:
    a first composite pipe of the mechanical piping system, wherein the first composite pipe is made by winding a first composite extrudate around a first internally supported structure wherein the first composite pipe comprises at least a first thermoplastic layer fused with a first tape layer to provide a first homogeneous pipe, and wherein the first pipe comprises a first connection element shoulder molded into and disposed on an outer surface of the first pipe, and wherein the first connection element shoulder comprises a first connection shoulder face that extends outward from a first non-raised portion of the first pipe;
    a composite second pipe of the mechanical piping system, wherein the second composite pipe is made by winding a second composite extrudate around a second internally supported structure wherein the second composite pipe comprises at least a second thermoplastic layer fused with a second tape layer to provide a second homogeneous pipe, and wherein the second pipe comprises a second connection element shoulder molded into and disposed on an outer surface of the second pipe, and wherein the second connection element comprises a second connection element shoulder face that extends outward from a second non-raised portion of the second pipe;
    an alignment element of the mechanical piping system, wherein the alignment element is
        configured to align and create a sealed flow path through the first pipe and the second pipe; and
        cylindrically sized to be at least partially circumferentially positioned within an internal bore of the first pipe and an internal bore of the second pipe; and
    an external collar assembly of the mechanical piping system, wherein the external collar assembly comprises a unitary collar assembly, and wherein the unitary collar assembly slides axially over the first connection element shoulder and the second connection element shoulder to laterally secure the first pipe relative to the second pipe.

2. The mechanical piping system of claim 1, wherein at least one of the first connection element and the second connection element comprises at least one of a ledge, a groove, and a shoulder.

3. The mechanical piping system of claim 1, wherein at least one of the first connection element and the second connection element comprises a molded composite film.

4. The mechanical piping system of claim 1, wherein at least one of the first connection element and the second connection element is fused with the corresponding first pipe and second pipe using electrofusion coupling.

5. The mechanical piping system of claim 1, wherein the alignment element comprises a t-connector.

6. The mechanical piping system of claim 1, wherein the alignment element comprises a rubber gasket operable to engage an end of the first pipe adjacent to the first connection element and an end of the second pipe adjacent to the second connection element.

7. The mechanical piping system of claim 1, wherein the alignment element comprises a bell assembly coupled to an end of the first pipe adjacent to the first connection element and a spigot assembly coupled to an end of the second pipe adjacent to the second connection element.

8. The mechanical piping system of claim 1, wherein the collar comprises at least one groove on an interior surface, wherein the collar is operable to engage at least one of the first connection element and the second connection element using a steel cable installed within the at least one groove.

9. The mechanical piping system of claim 1, wherein the collar comprises a bolt-on cage.

10. A method for using a mechanical piping system, comprising:
    providing a first composite pipe of the mechanical piping system, wherein the first composite pipe is made by winding a first composite extrudate around a first internally supported structure wherein the first composite pipe comprises at least a first thermoplastic layer fused with a first tape layer to provide a first homogeneous pipe, wherein the first pipe comprises a first connection element shoulder molded into and disposed on an outer surface of the first pipe, and wherein the first connection element shoulder comprises a first connection shoulder face that extends outward from a first non-raised portion of the first pipe;
    providing a second composite pipe of the mechanical piping system, wherein the second composite pipe is made by winding a second composite extrudate around a second internally supported structure wherein the second composite pipe comprises at least a second thermoplastic layer fused with a second tape layer to provide a second homogeneous pipe, wherein the second pipe comprises a second connection element shoulder molded into and disposed on an outer surface of the second pipe, and wherein the second connection element comprises a second connection element shoulder face that extends outward from a second non-raised portion of the second pipe;
    aligning the first pipe and the second pipe using an alignment element, wherein the alignment element creates a sealed flow path through the first pipe and the second pipe and is cylindrically sized to be at least partially circumferentially positioned within an internal bore of the first pipe and an internal bore of the second pipe; and
    laterally securing the first pipe relative to the second pipe using an external collar assembly, wherein the external collar assembly comprises a unitary collar that slides axially over and engages the first connection element shoulder and second connection element shoulder.

11. The method of claim 10, wherein at least one of the first connection element and the second connection element comprises at least one of a ledge, a groove, and a shoulder.

12. The method of claim 10, wherein at least one of the first connection element and the second connection element comprises a molded composite film.

13. The method of claim 10, wherein at least one of the first connection element and the second connection element is fused with the corresponding first pipe and second pipe using electrofusion coupling.

14. The method of claim 10, wherein the alignment element comprises a t-connector, and wherein the step of aligning the first pipe and the second pipe comprises partially inserting the t-connector within the first pipe and partially inserting the t-connector within the second pipe.

15. The method of claim 10, wherein the alignment element comprises a rubber gasket that engages both an end of the first composite pipe adjacent to the first connection element shoulder and an end of the second composite pipe adjacent to the second connection element shoulder.

16. The method of claim 10, wherein the step of laterally securing the first pipe relative to the second pipe comprises inserting a spigot assembly coupled to an end of the second pipe adjacent to the second connection element into a bell assembly coupled to an end of the first pipe adjacent to the first connection element.

17. The method of claim 10, wherein the step of laterally securing the first pipe relative to the second pipe comprises inserting a steel cable within at least one groove on an interior surface of the collar.

18. The method of claim 10, wherein the step of laterally securing the first pipe relative to the second pipe comprises bolting a cage around the first connection element and the second connection element.

* * * * *